United States Patent
Jaconette

[15] 3,663,919
[45] May 16, 1972

[54] GROUNDING SPRING FOR ELECTRICAL FIXTURES

[72] Inventor: Frank C. Jaconette, Trumbull, Conn.
[73] Assignee: Harvey Hubbell Incorporated, Bridgeport, Conn.
[22] Filed: June 16, 1970
[21] Appl. No.: 46,606

[52] U.S. Cl. ......................................................339/14 R
[51] Int. Cl. ...................................................H01r 3/06
[58] Field of Search......................339/14, 95, 132, 133, 122, 339/191, 192; 174/51, 53

[56] References Cited

UNITED STATES PATENTS

| | | | |
|---|---|---|---|
| 3,432,793 | 3/1969 | Muska et al. | 339/14 R |
| 3,185,760 | 5/1965 | Despard | 174/54 |
| 2,934,590 | 4/1960 | Thompson et al. | 174/53 |

*Primary Examiner*—Marvin A. Champion
*Assistant Examiner*—Robert A. Hafer
*Attorney*—Wooster, Davis and Cifelli

[57] ABSTRACT

A substantially L-shaped grounding member having a resilient main body, is affixed to the forwardly extending end arm of a substantially U-shaped metallic mounting yoke of an electrical fixture adapted to be mounted in a grounded standard metal outlet box. The resilient main body of the grounding member is operative to be wedgedly clamped between the end arm of the yoke and a juxtaposed portion of the metal box to thereby provide a direct and low resistance grounding path between the grounding circuit of the fixture and the metal box.

10 Claims, 8 Drawing Figures

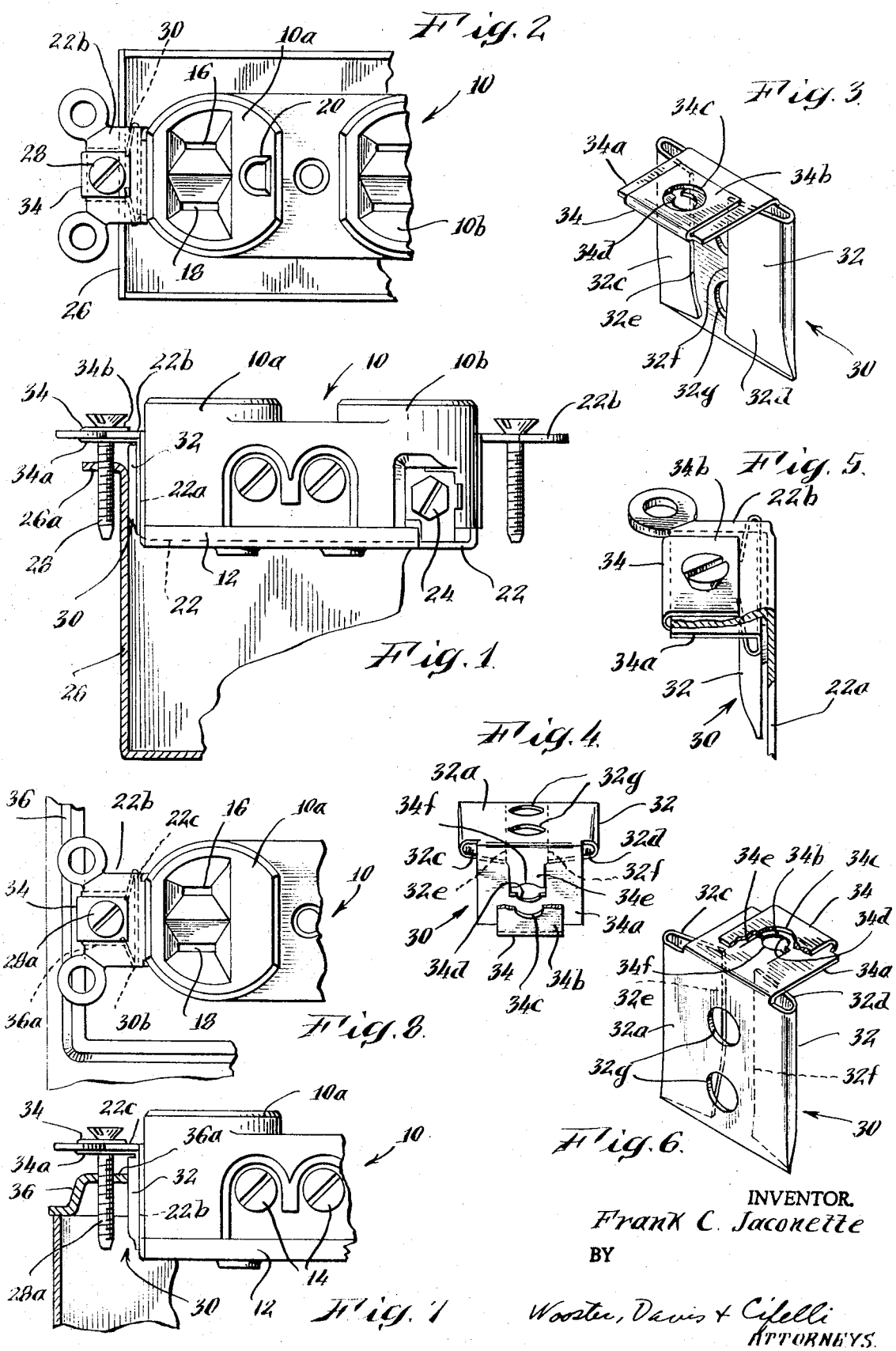

3,663,919

GROUNDING SPRING FOR ELECTRICAL FIXTURES

BACKGROUND OF THE INVENTION

The present invention relates to an improvement in grounding connections for electrical fixtures such as wall outlet receptacles and switches adapted to be mounted in the usual grounded wall outlet boxes mounted in openings in walls, baseboards, and the like, and to which lead wires of the house wiring system are connected.

It is conventional with such electrical fixtures to use a bonding jumper to establish the required grounding continuity or grounding path between the grounding circuit of the fixture and the electrically grounded outlet box. However, the use of a bonding jumper has the disadvantage that considerable time is involved in attaching this separate grounding wire to the fixture and the metal box and, moreover, often times the bonding jumper is disregarded or inadvertently overlooked during installation of the fixture to the box which, of course, causes a hazardous condition.

A further conventional manner of grounding such electrical fixtures is to establish the grounding continuity by a direct metal-to-metal contact between the metallic mounting yoke of the fixture and the grounded box. This type of grounding is permissible when the box is surface-mounted and, theoretically, does not require auxiliary grounding means. Technically, however, such a grounding joint has frequently proven to be unreliable mainly on account of the high resistance introduced in the grounding path at the transition point of the yoke and the box. Thus, for safety reasons, the bonding jumper is supplemented to improve the grounding continuity.

Still further known is a grounding connection established by a metallic contact device between the yoke and the grounded box. The contact device, in the form of a metallic wire clip, is unitary with laterally outwardly projecting apertured end portions of the yoke and consists of two elongated bronze wire members which are spaced from each other to define an opening in the clip and are in yieldable pressing contact with the shank of a brass mounting screw inserted through the clip opening and through the aperture in the end portions of the yoke to connect the latter to the metal box. Such a grounding connection is disclosed in U.S. Pat. No. 3,432,793.

This construction has the advantage that neither a direct metal-to-metal surface contact between the yoke and the metal box nor a bonding jumper is necessary for reasons that a grounding path is established through the wire clip and the threaded body of the brass mounting screw which is achieved mainly by upsetting a portion of the thread of the screw over substantially the entire length thereof.

On the other hand, however, the same construction has the disadvantage of a considerably high millivolt drop reading in the grounding path from the yoke to the metal box. Moreover, the mounting screws of this construction, of necessity, have to be made of a highly electrically conductive material such as brass, which is expensive, and in case such a brass mounting screw becomes lost on the job, the former will have to be replaced by the same type of screw or a screw made of similar expensive material so as to maintain the desired grounding continuity of the construction. Standard steel screws cannot be used in that they would defeat the grounding system on account of their lesser electrical conductivity and thus would create an undesired and possibly dangerous grounding condition.

Furthermore, since the grounding path is through the wire clip and the mounting screw, close tolerances will have to be maintained as regards the diameter of both the brass screw and the tapped hole in the metal box in which it is received, for if either of the two only slightly deviates from the design-diameter, the grounding path will not fully be secured which, of course, might cause a hazardous condition.

Finally, the brass mounting screws not only are uneconomical as regards their prime cost but, in addition, are not as solid as and do not have the thread cleaning feature of standard steel mounting screws.

SUMMARY OF THE INVENTION

It is a primary object of the invention to overcome the above disadvantages encountered with conventional grounding methods and to provide a new and useful one-part grounding connection which is simple as regards its construction, economical to manufacture and which, at all times and without the necessity of auxiliary grounding means, insures positive grounding of the electrical fixture to the metal outlet box.

A further object of the invention is to provide a grounding connection with such a characteristic design-configuration as to permit easy manual attachment of the connection to a standard electrical fixture, to facilitate rapid mounting of such an equipped electrical fixture in any type of standard metal box including those utilizing a raised or flat topper, to provide a direct and low resistance grounding path from the mounting yoke through the grounding connection to the metal box, and to realize a considerably low millivolt drop reading in this grounding path.

According to the invention, such a grounding connection comprises an inverted L-shaped metallic grounding member having a resilient main body and means for affixing the main body to the forwardly extending end arm of a substantially U-shaped metallic mounting yoke of an electrical fixture adapted to be mounted in a grounded metal outlet box, the resilient main body being operative to be wedgedly clamped intermediate the end arm of the yoke and a juxtaposed portion of the metal box to thereby provide a direct and low resistance grounding path between the grounding circuit of the fixture and the metal box.

These and other objects and features of the present invention will become apparent during the course of the following detailed description with reference to the accompanying drawings in which:

BRIEF DESCRIPTION OF THE DRAWINGS

FIG. 1 is a side plan view, partially broken away, of a grounding electrical fixture mounted in a grounded metal box and incorporating the grounding connection of the invention;

FIG. 2 is a top plan view of the arrangement of FIG. 1;

FIG. 3 is a perspective front view of the grounding connection shown in FIG. 1;

FIG. 4 is a perspective top view of the grounding connection shown in FIG. 3;

FIG. 5 is a perspective side view of the grounding connection shown in FIG. 3;

FIG. 6 is a perspective back view of the grounding connection shown in FIG. 3;

FIG. 7 is a view similar to that of FIG. 1, however, illustrating a further mode of application of the grounding connection of the invention; and FIG. 8 is a top plan view of the arrangement of FIG. 7.

DESCRIPTION OF THE PREFERRED EMBODIMENT

Referring now to the drawings in which like reference numerals index like parts and with attention initially directed to FIGS. 1 and 2, a duplex outlet receptacle is shown by way of example to illustrate the invention used in conjunction with the receptacle for grounding the latter to a metal box.

The receptacle includes a body 10 made of a suitable insulating material, such as a moldable plastic. The front face of body 10 defines individual conventional receptacles, 10a, 10b, and the back of the receptacle is covered by a suitable closure member, in this instance by the closure plate 12. Terminals 14 constitute means for connecting the line conductors to the receptacle contacts to provide energizing current to the receptacle. Each of the individual receptacles, 10a, 10b, defines a pair of spaced slots, 16, 18, associated with inner female contacts, not shown, for receiving the line blades of a male plug and a third semi-circular opening 20 associated with an inner female grounding contact, not shown, for receiving the grounding prong on the grounding male plug.

A conventional metallic mounting yoke 22 is fixed on the body 10 and extends along the rear thereof and includes forwardly extending end arms 22a which are in parallelism with the end faces of the body 10 and terminate in laterally outwardly bent end portions 22b. The yoke 22 is electrically connected to a grounding terminal 24 which is mounted thereon and which, in turn, is electrically connected, by means not shown, to the female grounding contacts inside the receptacle to provide a safety grounding circuit therein.

The receptacle, in the illustration of FIGS. 1 and 2, is mounted in a standard metal flush or outlet box 26 which is electrically grounded, for example to a water pipe, by means not shown. The end portions 22b of the yoke 22 are provided with conventional elongated slots 22c which permit passage of the shank portions of conventional steel mounting screws 28 which connect the yoke to the box 26. To this end, the box is provided with conventional external mounting lugs 26a provided with threaded openings which, in the usual fashion, threadedly intermesh with the threaded shanks of the screws. The receptacle is grounded to the outlet box 26 by means of an inverted L-shaped resilient metallic grounding member 30 embodied according to the invention and which comprises a compressible elongated grounding body 32 and an integral transversely angled and looped portion 34 which constitutes a connecting clip for supporting the member 30 on the yoke. The grounding body 32 is clampingly wedged and sandwiched in direction of its elongation between the outer surface of end arm 22a of the yoke and a juxtaposed inner surface portion of the outlet box 26. In this manner, the body 32 provides a correct grounding continuity with low electrical resistance between the aforementioned safety grounding circuit of the receptacle and the grounded outlet box.

In essence, and as shown in FIGS. 3, 4, 5, and 6, the grounding body 32 includes a back support 32a which, in assembled condition of the grounding member 30 on the receptacle; FIG. 5, abuts with its outer surface and with low electrical resistance against the outer surface of end arm 22a of the yoke. Laterally, the back support 32a terminates into two angular sections, 32c, 32d, which extend at substantially 45° angles relative to the back support and which, under strong pressure, are inwardly compressible in direction of the back support. In FIGS. 1 and 2, such strong pressure is imparted on the angular sections by the interior surface of the metal box and the thus compressed sections, in turn, exert a counter or expanding force on the inner box surface to thereby provide a positive and reliable grounding path between the yoke and the metal box. The lower end portions of the sections 32c, 32d, are substantially inwardly tapered so as to facilitate their insertion into the box and to permit easy and rapid mounting of the receptacle in the former.

The ends 32e, 32f, of the angular sections are formed into sharp edges which, during grounding of the receptacle to the metal box, cut through resistance-increasing foreign matter possibly present on the inner grounding surface of the box and, in grounded condition of the receptacle, these edges make a good and low resistance electrical contact with the inner box surface. The back support 32a further comprises extruded holes 32g which provide protruding edges on the outer surface of the back support and these edges engage the outer surface of the arm 22a of the yoke to establish a good electrical contact between the former and the grounding body.

The connecting clip 34 of the grounding member 30 is integral with the upper end of the back support 32a and comprises first and second clamping portions 34a, 34b, which clampingly receive the lateral end 22b of the yoke. The connecting clip is formed with axially aligned openings, 34c, 34d, FIG. 4, in its respective clamping portions 34a, 34b, and these openings, in turn, are axially aligned with the usual screw-receiving slot 22c in yoke end 22b to permit passage of the threaded shank of mounting screw 28 which suitably secures the grounding member to the yoke, and such securing of the grounding member may be done by the manufacturer. The lower clamping portion 34a of the clip is provided with a resilient in part downwardly curved lanced-out section 34e, FIG. 3, which comprises an arcuate end face 34f which constitutes part of the opening 34d, FIG. 4, and which operatively meshes with the threaded shank of mounting screw 28, FIG. 1, to retain the screw on the yoke.

It should be noted that neither the connecting clip 34 nor the mounting screw 28 are necessary to provide an electrical path for grounding the yoke to the metal box for it is a special feature of the invention to provide a grounding path directly from the yoke through the grounding body of the grounding member to the metal box.

The distance between the yoke end portion 22b and the mounting lug 26a of the box may be zero or if necessary one-half inch but, in either case, the grounding body 32 will always provide a good electrical connection between the yoke and the metal box.

In FIGS. 7 and 8, the grounding member of FIG. 1 electrically grounds the receptacle to a metal outlet box provided with a cover member 36 which, in this instance, is raised. The latter comprises an inwardly projecting mounting lug 36a having the usual threaded opening, not shown, in which the shank of mounting screw 28a is threadedly received to attach the lateral yoke end 22c to the cover 36.

The grounding body 30b of the grounding member, in this alternate arrangement of the outlet box, is groundingly wedged and sandwiched between the yoke arm surface 22b and the rounded edge of the mounting lug 36a and thereby provides a direct grounding continuity with low electrical resistance between the yoke and the metal box.

From FIGS. 7 and 8 it will be clear that the grounding member in no way obstructs passage of the screw 28a through the mounting lug 36a and that it does not interfere with the alignment of the respective openings in the yoke end arm 22c and the mounting lug. The same holds true as regards the arrangement shown in FIGS. 1 and 2.

Although the invention has been described as used in conjunction with a usual dual outlet receptacle, it will be appreciated that the novel grounding member can equally effectively be used with any other type of standard electrical fixtures to be mounted in a standard outlet box.

It is believed that the many advantages of this invention will now be apparent to those skilled in the art. It is also believed that many variations and modifications will be apparent which do not depart from the spirit and scope of the invention. Accordingly, the foregoing description is to be construed as illustrative only, rather than limiting. This invention is limited only by the scope of the following claims.

What is claimed is:

1. An electrical grounding fixture adapted to be mounted in an electrically grounded metal outlet box, comprising: a body of insulating material; a plurality of electrical contacts on said body, at least one of said electrical contacts being a grounding contact; a substantially U-shaped metallic mounting yoke fixed on said body and electrically coupled to said grounding contact, said yoke having an intermediate portion extending lengthwise of said body and a pair of spaced forwardly extending end arms in substantial parallelism with the ends of said body, said arms terminating in angled lateral portions provided with connecting means for securing the fixture to an outlet box; and a metallic grounding member for making direct and low resistance electrical connection between said yoke and the outlet box, said grounding member including a resilient elongated grounding body abutting with low electrical resistance one of said end arms of said yoke and being operative to be compressed between said one of said end arms and a juxtaposed interior wall portion of the outlet box when the fixture is mounted in the former, and mounting means for securing said grounding body to said yoke.

2. The grounding fixture as defined in claim 1, wherein said grounding body comprises a back portion abutting said one of said end arms of said yoke, and a pair of spaced front portions extending laterally inwardly from said back portion and forming acute angles therewith, said front portions being compressible toward said back portion and being operative to engage the interior wall portion of the outlet box.

3. The grounding fixture as defined in claim 2, wherein said front portions include inner ends apaced from each other and formed into sharp edges, and wherein said mounting means comprises a clip-shaped member retained by said connecting means on one of said angled lateral portions of said yoke and extending transversely relative to said grounding body and being integral with one end thereof.

4. The grounding fixture as defined in claim 3, wherein said connecting means comprises a standard steel mounting screw and a screw-receiving slot in said one of said lateral portions, and wherein said clip-shaped member comprises openings axially aligned with said screw-receiving slot for receiving the mounting screw inserted in said slot.

5. The grounding fixture as defined in claim 3, wherein said front portions are tapered in the region of the other end of said grounding body, and wherein said back portion comprises extruded holes providing metal edges on said back portion abutting said one of said end arms.

6. For use in effecting a direct low resistance electrical contact between a portion of a conventional substantially U-shaped grounding mounting yoke of an electrical fixture and a surface portion of a grounded mounted wall box, a grounding member comprising: an elongated compressible grounding body of spring sheet metal including straight back portion means for abutting a portion of the U-shaped grounding mounting yoke, said back portion means including a substantially planar surface which abuts a substantially planar surface of the U-shaped mounting yoke, and a pair of spaced front portion means extending laterally inwardly from said back portion means and extending at acute angles thereto for being compressed between an inner surface of the box and said back portion means when the fixture is mounted within the box, said grounding member permitting easy removal of the fixture from the box and being reusable.

7. The grounding member defined in claim 6, which further comprises a clip-shaped mounting member arranged to be retained on a portion of the yoke for securing said grounding body to the yoke, said clip-shaped member being integral with one end of said grounding body and extending at an angle thereto.

8. The grounding member defined in claim 6, wherein said front portion means include inner ends spaced from each other, formed into sharp edges and arranged on the insertion of the fixture into the box to dig into a wall surface of the box.

9. The grounding member is defined as claim 6, which further comprises mounting means at one end of said grounding body for securing the latter to the yoke, and said front portion means are tapered in the region of the other end of said grounding body to facilitate mounting of the fixture and grounding body into a wall box.

10. For use in effecting a direct low resistance electrical contact between a portion of a conventional substantially U-shaped grounding mounting yoke of an electrical fixture and a surface portion of a grounded mounted wall box, a grounding member comprising: an elongated compressible grounding body of spring sheet metal including a straight back portion arranged to abut a portion of the mounting yoke, said back portion including extruded holes providing metal edges on said back portion arranged to abut a portion of the mounting yoke, and a pair of spaced front portions extending laterally inwardly from said back portion and extending at acute angles thereto, said front portions being arranged to be compressed between an inner surface of the box and said back portion upon insertion of the fixture into the box and permit easy removal of the fixture and reuse of said grounding member.

* * * * *